United States Patent [19]

Frank et al.

[11] Patent Number: 4,615,617
[45] Date of Patent: Oct. 7, 1986

[54] PULSE DELAY MEASUREMENT APPARATUS

[75] Inventors: Peter Frank, Berneck; Kurt Giger, Heerbrugg, both of Switzerland

[73] Assignee: Wild Heerbrugg Aktiengesellschaft, Switzerland

[21] Appl. No.: 488,767

[22] Filed: Apr. 26, 1983

[30] Foreign Application Priority Data

May 6, 1982 [CH] Switzerland ............ 2814/82

[51] Int. Cl.⁴ .................................. G01C 3/08
[52] U.S. Cl. ........................... 356/5; 342/174; 342/135
[58] Field of Search ........... 356/4, 5; 343/12 R, 343/17.7, 17.1 R, 13 R; 370/103, 108; 375/110, 117

[56] References Cited

U.S. PATENT DOCUMENTS

| | | | |
|---|---|---|---|
| 3,541,448 | 11/1970 | Nutt | 324/186 |
| 3,619,058 | 11/1971 | Hewlett et al. | 250/204 |
| 3,652,161 | 3/1972 | Ross | 356/5 |
| 3,900,261 | 8/1975 | Wingate | 356/5 |
| 4,095,224 | 6/1978 | Dounce et al. | 343/17.1 R |
| 4,159,873 | 7/1979 | Farnsworth | 356/5 |
| 4,197,535 | 4/1980 | Koethmann et al. | 343/17.1 R |
| 4,203,112 | 5/1980 | Wocher et al. | 343/17.1 R |
| 4,250,454 | 2/1981 | Sakamoto | 343/17.1 R |
| 4,274,736 | 6/1981 | Balmer | 356/5 |
| 4,297,030 | 10/1981 | Chaborski | 356/5 |
| 4,521,107 | 6/1985 | Chaborski et al. | 356/5 |

FOREIGN PATENT DOCUMENTS 2842450 4/1980 Fed. Rep. of Germany.

OTHER PUBLICATIONS

1973 Wescon Technical Papers, vol. 17, pp. 1–5, article by F. Rode, "The Central Processor Unit (CPU) an Integral Part of Measuring Instruments".

*Primary Examiner*—S. C. Buczinski
*Attorney, Agent, or Firm*—Roylance, Abrams, Berdo & Goodman

[57] ABSTRACT

An apparatus for measuring the delay time interval between electrical pulse signals, particularly in conjunction with electrooptical range finders. A coarse measuring counter counts clock pulses from a quartz oscillator during the interval and a fine measuring interpolator determines the residual time from the end of the interval to the next clock pulse. Residual time at the start of the measuring interval is avoided by exactly synchronizating the start of measurement with a timing pulse front (n+2) of the quartz oscillator.

15 Claims, 4 Drawing Figures

PULSE DELAY MEASUREMENT APPARATUS

This invention relates to an apparatus for measuring the delay time of pulse signals and, particularly, electrical pulse signals representative of reflected energy in an optical pulse radar system.

BACKGROUND OF THE INVENTION

As is known, optical pulsed radar, equipment must measure ranges by using the delay time principle. The time interval between the transmission of a transmitted signal and the reception of an echo signal is used as a measure of the distance from the transmitter-receiver to the target. Between those two signals, pulses supplied to an evaluation circuit by a crystal oscillator, commonly a quartz oscillator having a fixed frequency, are counted. The transmitted signal, or a pulse occurring with the transmitted signal, is used as a start signal and the received or echo signal is used as a stop signal for the control of the evaluation circuit. Details of such an apparatus can be found in the article "Measuring Short Ranges with the Aid of Optical Pulsed Radar Equipment," Nachrichtentechnische Zeitschrift, 1973, No. 9, pp. 535 to 540. This technique has the difficulty that there is no correlation between the transmitted signal (or the start signal) which starts the pulse counting and the leading edges of the pulses of the quartz oscillator, nor between the received signal (echo signal) which is used to end the pulse counting and the pulse fronts of the oscillator. Thus, at the beginning and end of the pulse counting, there are residual times which are not taken into consideration and are not evaluated for range measurement purposes. Each of these undeterminec residual times is smaller than the interval between two clock pulses. It is quite acceptable to ignore those residual times when accomplishing rather coarse range measurements involving large numbers of meters or kilometers. However, a technique which ignores these residual times is inadequately accurate for fine range measurements requiring accuracies in the order of millimeters and centimeters.

German OS No. 2,842,450 and U.S. Pat. No. 3,541,448 disclose methods and devices which, in a coarse measurement, take account of the range and, in an additional fine measurement, take account of the residual times. The precise range is then derived from those two measurements. However, such apparatus has the disadvantage of being very expensive. The known devices are also too heavy and large and therefore unsuitable for mobile use as, for example, a range finder in geodesy. It is not possible to achieve adequate miniaturization with the technical means based on the known devices and methods.

BRIEF SUMMARY OF THE INVENTION

Accordingly, an object of the present invention is to provide an apparatus for accurately determining the delay interval between pulses, which apparatus has simpler construction than known means and makes possible the construction of a compact piece of equipment which can be used in a mobile manner without difficulty as, for example, a geodesic range finder, while still providing the desired high measuring accuracy, easy operation and reliable presentation of the measured values.

Briefly described, the invention includes an apparatus for determining the delay interval between pulse signals comprising a source of clock pulses; an evaluation circuit including a coarse counter for counting clock pulses between a start signal and a stop signal representative of the beginning and end of the delay interval, and interpolator circuit means for measuring the residual time between the end of the last counted clock pulse and the end of the delay interval; and means for exactly synchronizing the start signal with the leading edge of a clock pulse to eliminate residual time at the beginning of the measurement.

This technique provides a simple time evaluation of voltage signals which are analogous to each step in each measuring process, and the prerequisite for miniaturization of the apparatus is satisfied, permitting it to be incorporated into handy, easily usable equipment. It is particularly advantageous that, depending upon the requirements made on the measuring accuracy, averaging can take place over a larger or smaller number of individual measurements. In addition, the evaluation in the measuring section is simplified because the calibrating voltage amplitude can be directly subtracted from the measuring voltage amplitude. As a function of the use, it is possible to form an average on the basis of a mathematical analog. It is also advantageous that the statistical fluctuations in the measured quantity are reduced because the number of circuits causing fluctuations of this type is reduced.

BRIEF DESCRIPTION OF THE DRAWINGS

In order that the manner in which the foregoing and other objects are attained in accordance with the invention can be understood in detail, a particularly advantageous embodiment thereof will be described with reference to the accompanying drawings, which form a part of this specification, and wherein.

DETAILED DESCRIPTION OF THE PREFERRED EMBODIMENT

Figure 1:
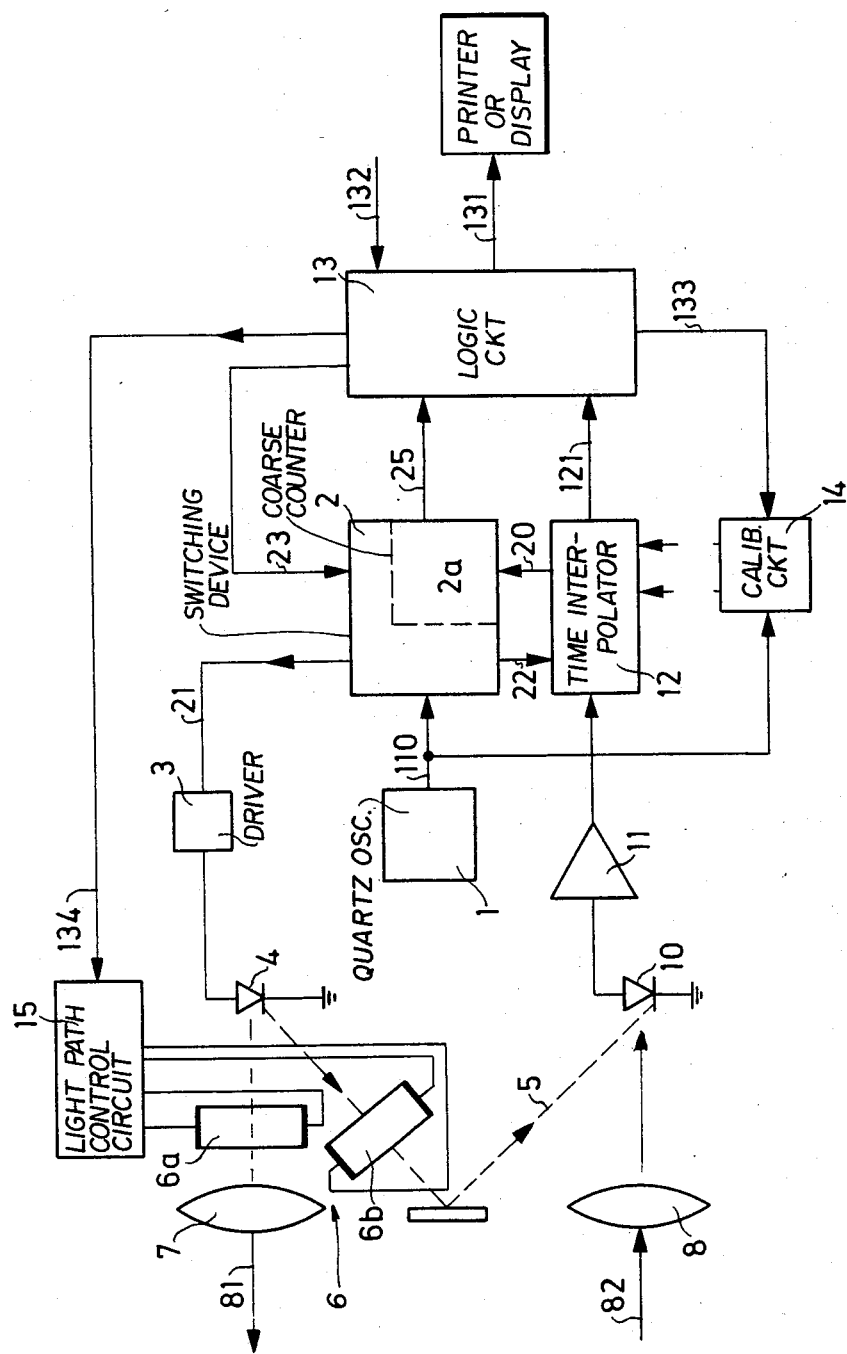
FIG. 1 is a schematic block diagram of an apparatus in accordance with the invention including an evaluation circuit.

As shown in FIG. 1, the apparatus includes a quartz crystal oscillator 1 which produces a substantially constant sequence of equally spaced clock pulses of short duration. The pulses from oscillator 1 are delivered to a switching device 2 and a calibration circuit 14. In synchronization with pulses delivered by oscillator 1 on line 110, and in response to a "start" command, switching device 2 produces a pulse on line 21 which controls a driver circuit 3 which, in turn, activates a pulse transmitter 4. Transmitter 4, a light producing device which can be in the nature of a light emitting diode, produces light pulse signals which are transmitted along either a calibration path 5 or a measuring path 81, the selection being controlled by a light path reversing switch indicated generally at 6 which is illustrated as having parts 6a and 6b. The pulses transmitted along path 81 are reflected from a target, not shown in the drawing, and reflected light "echoes" return along a path 82 through reception optics 8 to be received by a receiver 10 which can be a light-sensitive diode circuit. It will be observed that diode 10 produces an electrical pulse in response to a pulse of light received along either calibration path 5 or measuring path 82. The states of the light path reversing switch components 6a, 6b are controlled by a light path control circuit 15 in response to a signal received on line 134 from a logic circuit 13.

The electrical signals produced by receiver 10 are amplified in an amplifier 11 and supplied to a time interpolator 12. Circuit 12 provides an output on line 121 to logic circuit 13 and receives start and stop signals from calibration circuit 14. Interpolator circuit 12 also supplies information to switching device 2 and receives signals therefrom.

Turning now to a more detailed description of the circuit components shown in FIG. 1, a trigger signal from an outside source, not shown, is supplied on line 132 to logic circuit 13 in order to initiate a measuring cycle. In response to this, a signal is produced on a start line 133 and is supplied to calibration circuit 14 which, in turn, provides a start signal to time interpolator 12 for the purpose of commencing the calibration process of that circuit. Clock pulses from oscillator 1 are supplied on line 110 to calibration circuit 14 and, in coincidence with the leading edges of pulses from oscillator 1, circuit 14 produces the start and stop signals with precisely defined time intervals which are supplied to interpolator 12. The interpolated values from circuit 12 are delivered on line 121 to logic circuit 13 where they are initially stored and are available for subsequent use during evaluation by the measuring section.

In the first state, control circuit 15 is operated by a signal supplied on line 134 to control the light path reversing switch 6 so that signals emanating from transmitter 4 are switched onto the calibrating path 5 to reach receiver 10. By means of a selection line 23, switching device 2 is controlled in such a way by logic circuit 13 that, in response to the next timing pulse on timing line 110, it supplies a start signal on driver line 21 which stimulates driver 3 to cause transmitter 4 to supply a light pulse. Simultaneously with the signal on line 21, a coarse measuring counter 2a, which forms a part of switching device 2, is activated and begins counting clock pulses supplied by oscillator 1. The light pulse generated by transmitter 4 passes along calibrating path 5 to receiver 10 and the amplified electrical signal produced by receiver 10 is received by time interpolator 12. Interpolator 12 begins a time interpolation cycle and stops the counting of clock pulses by the coarse measuring counter by a signal on line 20. Time interpolation is stopped with the arrival of the next timing pulse from oscillator 1 delivered on interpolation stop line 22.

The coarse counter supplies to logic circuit 13 a count of the pulse fronts which have been counted on line 25 and logic circuit 13 also receives a signal having a value representative of the interval between the stop signal and the following timing signal of oscillator 1 on interpolator output line 121. Depending upon the precision requirements, the process of initiating a light pulse and measuring the residual interval can be reiterated any selected number of times so that n measurements are obtained. Following this calibration process in which light was transmitted along calibration path 5, the measurement process itself can be accomplished by reversing the light path switch 6 and transmitting light along path 81, and a number m of individual measurements of the distance to the "target" object can be made, the light being reflected from the object and returned along path 82.

As will be recognized, the sequence of the calibration process using the time interpolator, the measurements using the internal calibrating path 5, and the measurements related to the object to be surveyed can be adapted to relevant precision requirements.

The light path reversing switch 6 can be a mechanical diaphragm or shutter capable of moving at high speed into one position for blocking the measuring path and into another position for blocking the calibrating path 5. Alternatively, as illustrated in FIG. 1, reversing switch 6 can include two cells 6a and 6b, one of which is inserted in the measuring path and the other in the calibrating path. These cells can be Kerr cells which are alternately electrically controlled to cause one of the two paths to be blocked. The light lath reversing switch 6 could also comprise an electro-optical ceramic element or any other mean to switch or attenuate optical paths which functions in such a way that the light pulses from transmitter 4 pass to either the calibrating path or the measuring path as a function of the direction of an applied electrical field.

Evaluation using the measuring path takes place with the aid of the previously stored measured values in logic circuit 13. The resulting range value then passes along an output line 131 to a printer or display means. In the latter, the characteristics of the path length between transmitter 4 and receiver 10 via the target is displayed as a length, e.g., in meters, centimeters or inches.

Figure 2:
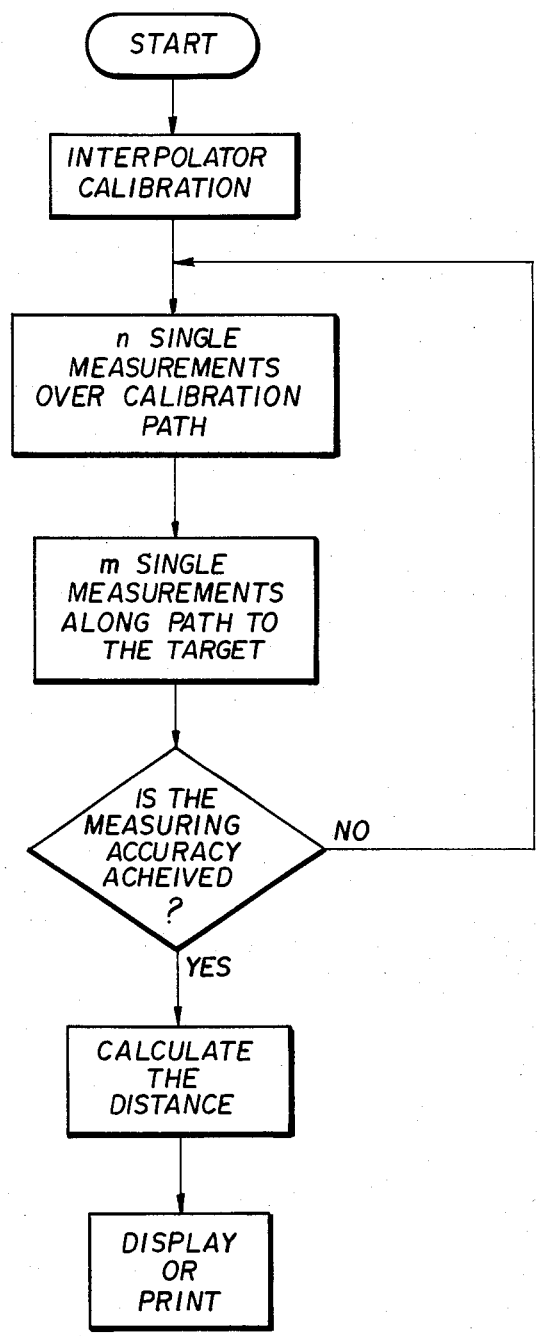
FIG. 2 is a functional flow diagram illustrating steps involved in the measuring sequence.

FIG. 2 illustrates the overall measuring sequence in the form of a functional flow chart in which the interpolation and calibration occurs first, using n single measurements over the calibration path. M single measurements over the path directed to the target then occur, after which the results can be analyzed to determine whether the measuring accuracy has been achieved. If not, the measurements can be repeated; if so, the resulting signal values are used to calculate the distance which is then printed or displayed.

Figure 3:
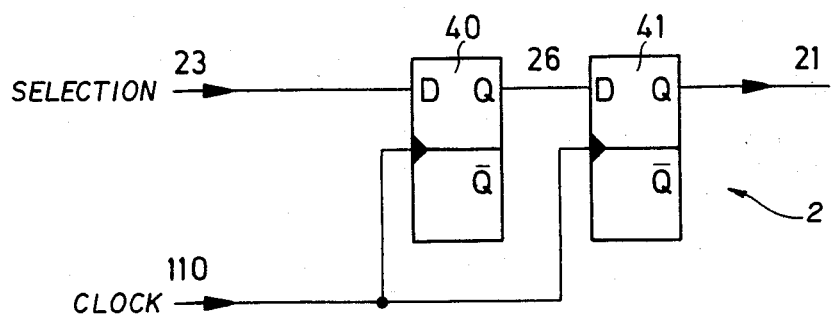
FIG. 3 is a more detailed block diagram of a portion of the apparatus of FIG. 1.

FIG. 3 shows in greater detail an embodiment of a switching device 2 usable in the apparatus of FIG. 2 for producing the start pulses for transmitter 4. A pulse-triggered bistable flip-flop or toggle circuit 40 receives a signal on its signal input D along selection line 23 and a control signal is supplied at the C input on clock pulse line 110. A second pulse-triggered flip-flop or toggle circuit 41 is connected downstream of circuit 40, receiving the Q output from circuit 40 at the D input of circuit 41 on line 26, circuit 41 also being supplied with a toggle input from clock line 110. The Q output of circuit 41 is the pulse along line 21 which activates the transmitter driver 3. Circuits 40 and 41 are preferably triggered J-K flip-flops.

Figure 4:
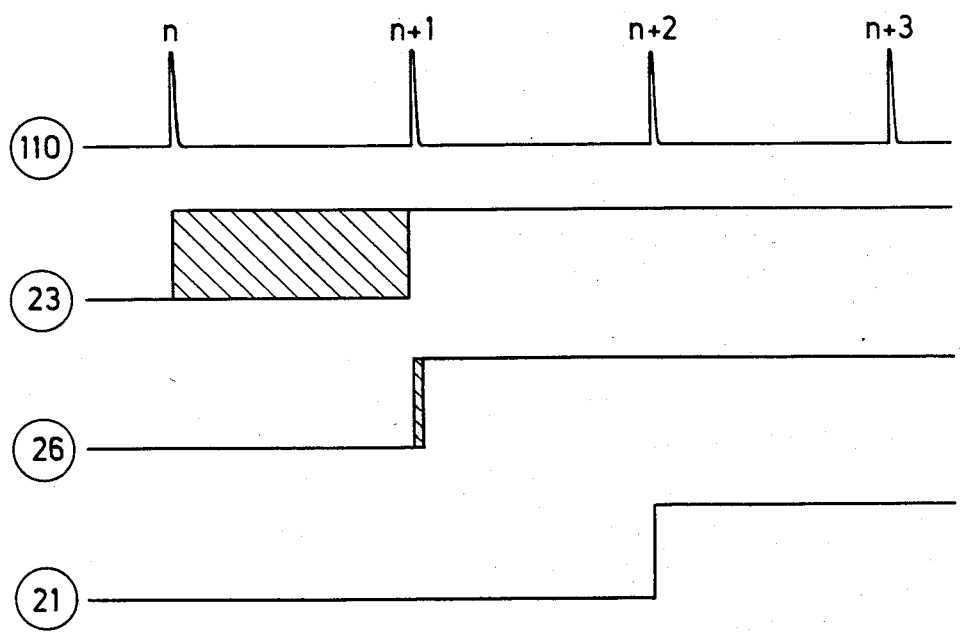
FIG. 4 is a timing diagram showing the time relationship of signals occurring in portions of the apparatus of FIG. 3.

The function of this switching device can be explained in connection with the timing diagram of FIG. 4 which shows the clock pulses on line 110, the selection signal on line 23, the interconnecting signal on line 26 and the resulting output signal on line 21. When a measurement is to be performed, a trigger signal appears on selection line 23. The next pulse front of the clock signal from oscillator 1 on line 110 causes the selection signal to be passed along to line 26. However, the output on line 26 is not yet sufficiently well synchronized to the pulse front of the clock signals on line 110 because the first pulse-triggered toggle circuit 40 modifies the delay between the leading edge of the timing pulse and the signal on line 26 as a function of the time at which the trigger signal appears on selection line 23, this indefiniteness being indicated in FIG. 4 by the hatched region. When the timing pulse n+2 appears, the signal on control line 21 is absolutely synchronous so that the transmitter 4 is controlled synchronously to the timing pulses, serving as counting pulses. Thus, residual time at the start of pulse counting is avoided. As a result, for precise measurement purposes, it is necessary only to determine the residual time at the end of the pulse counting.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus to measure distance by measuring the time of propagation of light pulses, comprising a source of clock pulses of known period, a light pulse transmitter, a measurement path and a calibration path for the light pulses from said pulse transmitter, an optical receiver to receive light pulses traversing both said measurement path and said calibration path, means to direct said light pulses from said light pulse transmitter to either said measurement path or said calibration path; logic means interconnecting and controlling the operation of said measurement path, said calibration path, said light pulse transmitter, said light pulse direction means, and output means; and means to precisely synchronize a predetermined portion of a clock pulse with a signal from said logic means to said light pulse transmitter commanding said light pulse transmitter to emit a pulse of light, wherein said logic means includes a switching device and a calibrating circuit connected to the source of clock pulses, means to connect one of the outputs of the switching circuit to said light pulse transmitter, a counter for the total period of the clock pulses received from said source by said optical receiver, an interpolator having one input connected to the optical receiver and further inputs thereof connected to said calibration circuit, and means to connect the outputs of the interpolator to said counter.

2. An apparatus as defined in claim 1, wherein said switching device further includes first and second trigger circuits connected in series with the first input to said trigger circuits connected to the source of the clock pulses; means to connect the second input of the first trigger circuit via a selection line to a logic circuit, means to connect the output of said first trigger circuit via a line to the second input of the second trigger circuit and means to connect the output of the second trigger circuit via a supply line to a driver circuit for the light pulse transmitter.

3. An apparatus as defined in the claim 1, wherein said means to direct light pulses includes a light path reversing switch for alternatively directing the light pulses emitted by the transmitter into the calibration path or into the measurement path.

4. An apparatus as defined in claim 3, wherein said light path reversing switch includes a first Kerr cell placed in the measuring path and a second Kerr cell placed in the calibrating path and wherein a light path control circuit alternately actuates said cells.

5. An apparatus as defined in claim 3, wherein said light path reversing switch includes electro-optical ceramic cells.

6. An apparatus as defined in claim 3, wherein the reversing switch is controlled by a light path controlling switch controlled in turn by said logic means.

7. An apparatus as defined in claim 1, wherein a driver is interconnected between the light pulse transmitter and the logic means.

8. An apparatus to measure a distance by measuring the time of propagation of a light pulse comprising a source of clock pulses each having a period of known length, a light pulse transmitter, a measurement path, a calibration path, an optical receiver to receive the light pulses emitted from said transmitter, logic means controlling the apparatus and causing outputting of measured values corresponding to said distances, said logic means comprising means to direct a respective light pulse emitted from said transmitter and forming a start signal for counting whole periods of the clock pulses to either said calibration path or said measurement path, means to synchronize the emission of a light pulse from the transmitter with one edge of one of the clock pulses in order to eliminate residual time at the beginning of each measurement, an evaluation circuit including a coarse counter for counting whole periods of the clock pulses between said start signal and a stop signal, means to cause said stop signal to be produced by a light pulse being received by said receiver, an interpolator for measuring residual time between the moment of the appearance of said stop signal and the end of that one of the counted clock pulse periods within which said stop signal appeared, and means to connect the output of said interpolator and the output of the coarse counter to said logic means.

9. An apparatus as defined in claim 8, wherein said means to precisely synchronize the transmission of a light pulse comprises a switching device one input of which is connected to said source of clock pulses and a second input of which is connected to said logic means triggering this apparatus and an output of said switch being connected to said light pulse transmitter.

10. An apparatus as defined in claim 9, wherein said switching device further includes first and second trigger circuits connected in series with the first input to said trigger circuits connected to the source of the clock pulses; means to connect the second input of the first trigger circuit via a selection line to a logic circuit, means to connect the output of said first trigger circuit via a line to the second input of the second trigger circuit and means to connect the output of the second trigger circuit via a supply line to a driver circuit for the light pulse transmitter.

11. An apparatus as defined in claim 8, wherein said means to direct light pulses includes a light path reversing switch for alternatively directing the light pulses emitted by the transmitter into said calibration path or into said measurement path.

12. An apparatus as defined in claim 11, wherein said light path reversing switch includes a first Kerr cell placed in the measuring path and a second Kerr cell placed in the calibrating path and wherein a light path control circuit alternately actuates said cells.

13. An apparatus as defined in claim 11, wherein said light path reversing switch includes electro-optical ceramic cells.

14. An apparatus as defined in claim 11, wherein the reversing switch is controlled by a light path controlling switch controlled in turn by said logic means.

15. An apparatus as defined in claim 8, wherein a driver is interconnected between the light pulse transmitter and the logic means.

* * * * *